United States Patent [19]
Yoshida

[11] Patent Number: 5,495,480
[45] Date of Patent: Feb. 27, 1996

[54] PACKET TRANSMISSION SYSTEM HAVING TIMER FOR CIRCUIT DISCONNECTION

[75] Inventor: Atsushi Yoshida, Tokyo, Japan

[73] Assignee: NEC Corporation, Japan

[21] Appl. No.: 262,858

[22] Filed: Jun. 21, 1994

[30] Foreign Application Priority Data

Jun. 21, 1993  [JP]  Japan .................... 5-148997

[51] Int. Cl.[6] .................... H04Q 11/04; H04J 3/24
[52] U.S. Cl. .................... 370/60; 370/79; 370/85.13; 370/94.1
[58] Field of Search .................... 370/94.1, 48, 91, 370/58.2, 58.3, 79, 82, 85.3, 94.2, 94.3, 85.13, 110.1, 60

[56] References Cited

U.S. PATENT DOCUMENTS 5,267,238  11/1993  Yano et al. .................... 370/94.3
5,341,363  8/1994  Hirasawa .................... 370/85.3
5,351,237  9/1994  Shinohara et al. .................... 370/94.3

Primary Examiner—Alpus Hsu
Assistant Examiner—Ricky Ngo
Attorney, Agent, or Firm—Ostrolenk, Faber, Gerb & Soffen

[57] ABSTRACT

A packet transmission system comprises a routing processor and data-circuit terminating equipment (DCE) for transmitting data packets between a LAN and a public network, and further includes a table where timer set values corresponding to types of data packet protocol are stored in advance, and a timer which starts counting at the time of packet termination and stops counting when its count value reaches a selected timer set value. The table selects one of the timer set values based on the type of a data packet to be transmitted from the LAN to the public network. The timer outputs a disconnection signal to the DCE when its count value reaches the selected timer set value.

12 Claims, 9 Drawing Sheets

FIG. 3A
PACKET FORMAT FOR LAN INTERFACE
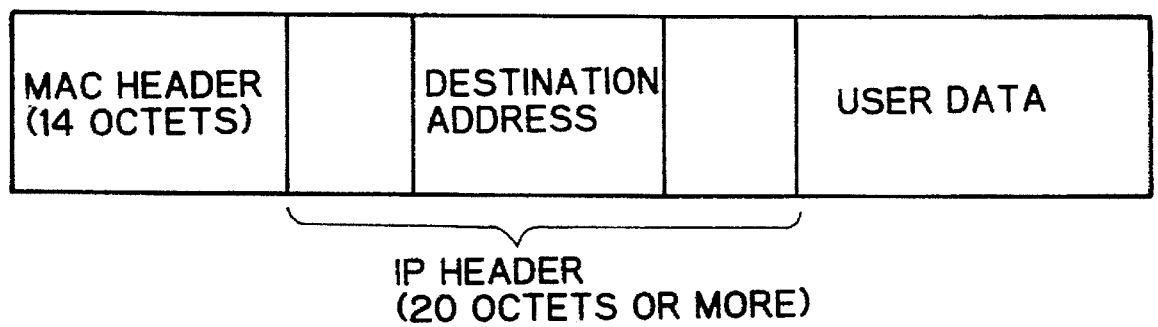
FIG. 3B
PACKET FORMAT FOR CIRCUIT INTERFACE
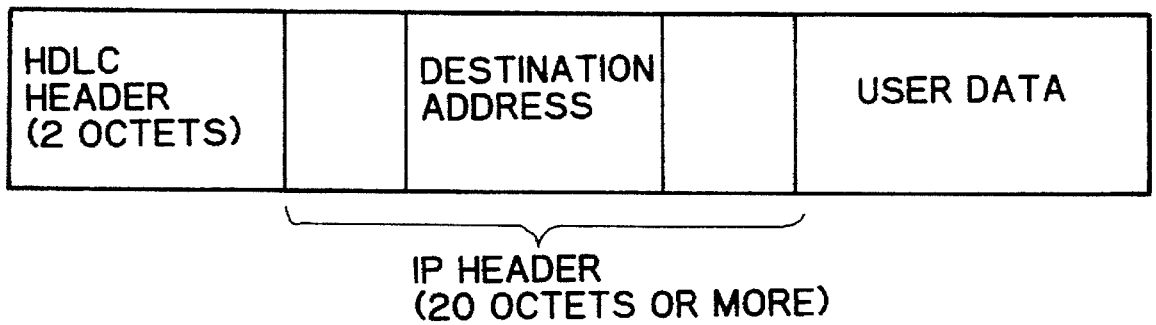
FIG. 3C
ROUTING TABLE
| DESTINATION ADDRESS | OUTPUT PORT |
|---|---|
| A1 | LAN |
| A2 | CIRCUIT |
| A3 | LAN |

FIG.9

TABLE 103

| PORT NUMBER | TIMER SET VALUE | |
|---|---|---|
| 10 | 10 | ← FTP |
| 23 | 600 | ← TELNET |
| | | |
| | | |
| | | |

PACKET TRANSMISSION SYSTEM HAVING TIMER FOR CIRCUIT DISCONNECTION

FIELD OF THE INVENTION

The present invention relates to a transmission system enabling data packets to be transferred between two different networks and, more particularly, to a packet transmission system utilized in router equipment connecting two different networks.

BACKGROUND OF THE INVENTION

Recent wide use of Local Area Networks (LANs) is increasing the demand for connecting a LAN with another or connecting a LAN with a Wide Area Network (WAN). For example, there can be considered a case where LANs geographically distant from each other are connected through a public network to transfer electronic mails and data files. A router is used as a device connecting a Local Area Network with another through a Wide Area Network. The router analyzes the header of a received data packet for routing and transfers the packet to the destination Local Area Network through the Wide Area Network.

A conventional packet transmission system in such a router is designed to disconnect the public circuit when a predetermined time interval passes after the transmission of data packets between the LAN and the public network has come to an end. That is, the system is provided with a timer in which a time interval is set in advance. When the packet transmission ends, the timer is started, and when the set time has elapsed, the public circuit is disconnected according to a output signal of the timer. The timer is set for a fixed time interval selected by the user at system installation.

In the conventional packet transmission system, however, the timer is usually set in advance for a relatively large value so that the public circuit is not disconnected in the middle of operation in any service. For example, in the case of a conversational processing application where the higher level protocol is a remote terminal protocol such as TELNET and a data packet is transmitted each time the operator taps the keyboard, the timer must be set for a enough time interval that the public circuit is not disconnected in the middle of operation. On the other hand, in consecutive processing application of a file transfer protocol (FTP), a short timer set value is sufficient. Therefore, in the conventional system in which the timer set value is fixed, the timer is set for a time interval long enough to accommodate a conversational protocol as TELNET.

In this way, in a case where the higher level application is an FTP which transfers packets at high speed, a problem arises in that public-circuit connection continues long after the transmission has ended. As a result, the public circuit is prevented from efficient use. From the view point of the user, it adversely affects service charges.

An object of the present invention is to provide a packet transmission system which enables a public circuit to be used efficiently while saving on service charges.

SUMMARY OF THE INVENTION

A packet transmission system according to the present invention comprises a routing processor and data-circuit terminating equipment (DCE) for transmitting data packets between a LAN and a public network, and further comprises a table where timer set values corresponding to types of data packet protocol are stored in advance, and a timer which starts counting at the time of packet termination and stops counting when its count value reaches a selected timer set value. The table selects one of the timer set values based on the type of a data packet to be transmitted from the LAN to the public network. The timer outputs a disconnection signal to the DCE when its count value reaches the selected timer set value.

The timing of public circuit disconnection is determined depending on the type of higher level protocol of a transmitted data packet. In other words, a disconnection timing set value is prepared corresponding to the type of a higher level protocol in advance and the timer for public-circuit disconnection operates based on the set value. Specifically, a public circuit is connected when a data packet is transmitted to or received from a destination. The timer is started when the transmission of data packets has come to an end. If a data packet is transmitted or received before this timer reaches the set value, the timer stops. When the timer reaches the set value, the public circuit is disconnected.

Preferably, the timer set value is stored in memory in the form of a table corresponding to the type of higher level protocol. For example, in the case of an FTP application which transfers packets consecutively at high speed, the timer is set for a small enough value to disconnect the public circuit in a short time and, in the case of remote terminal protocol application, the timer is set for a large enough value to disconnect the public circuit after sufficient time has elapsed.

In a packet based on TCP/IP (transmission control protocol/internet protocol) specifications, the type of higher level protocol is identified by the source port address in the TCP header. A table in which source port addresses and their corresponding timer set values are stored is prepared in advance. The source port address of a transmitted packet is used to reference the table and the corresponding timer set value is read out. Then, the timer starts for the read timer set value when the transmission of packets ends. When the timer reaches the set value, the public circuit is disconnected.

BRIEF DESCRIPTION OF THE DRAWINGS

FIG. 3A is a diagram illustrating a packet format for the LAN interface shown in FIG. 1;

FIG. 3B is a diagram illustrating a packet format for the line interface shown in FIG. 1;

FIG. 3C is a schematic diagram illustrating a routing table where the output ports corresponding to destination addresses are determined;

FIG. 9 is a schematic diagram showing an example of relationship between source port numbers and timer set values stored in a table in the embodiment.

DETAILED DESCRIPTION OF THE PREFERRED EMBODIMENTS

Figure 1:
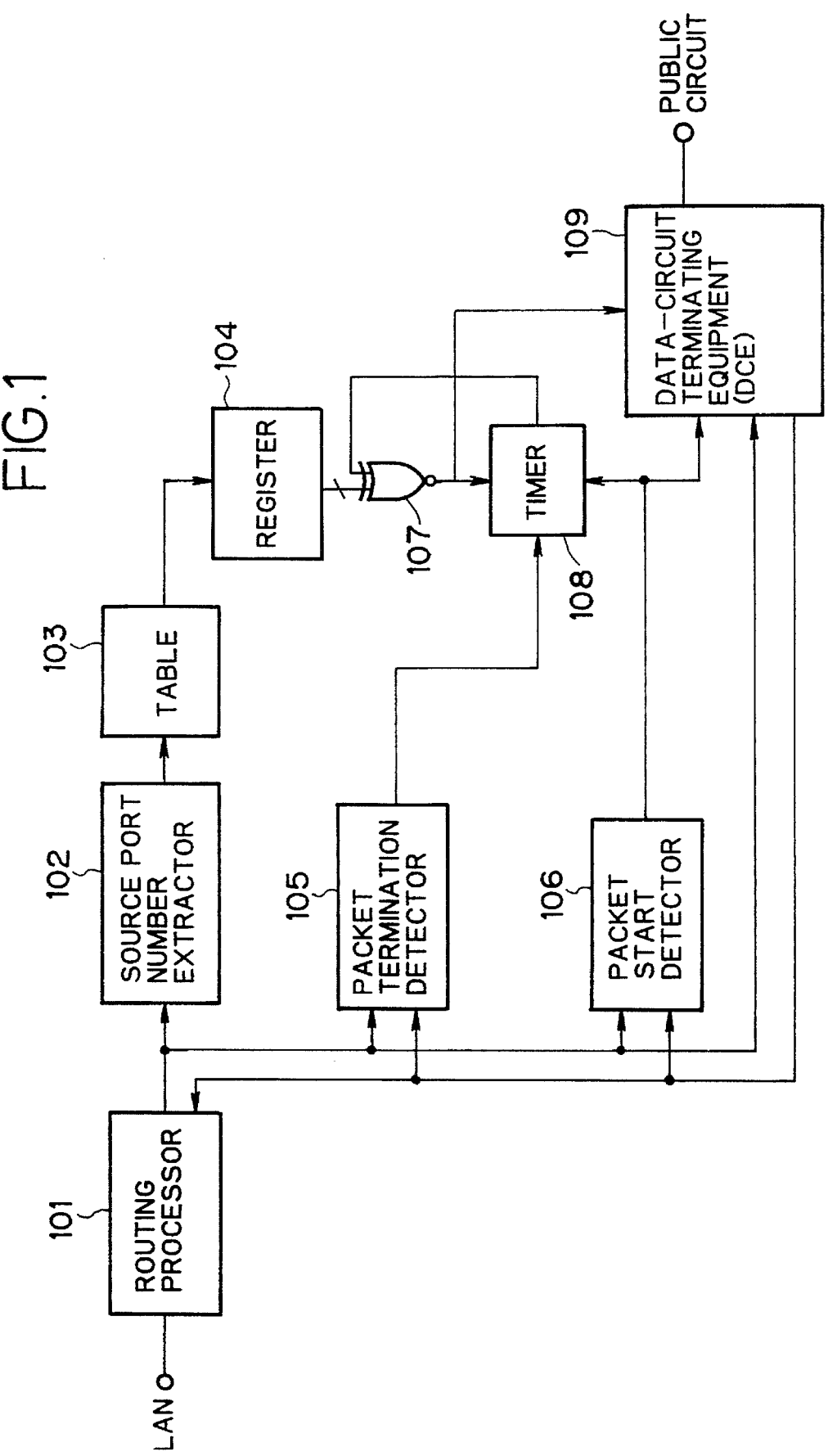
FIG. 1 is a block diagram illustrating a packet transmission system of an embodiment according to the present invention.

FIG. 1 shows a packet transmission system of an embodiment according to the present invention. A data packet in this embodiment conforms to TCP/IP specifications.

First, on receipt of a transmitted data packet from the Local Area Network (LAN), a routing processor 101 determines the destination of the packet and transfers it to Data Circuit-terminating Equipment (DCE) 109 if the packet is to be transmitted to a public circuit. A data packet received from a public circuit is demodulated by the DCE 109, and is transferred to the routing processor 101. The routing processor 101 determines the destination of the data packet to transmit it to the LAN.

A source port number extractor 102 receives a transmitted packet from the routing processor 101, and detects the source port address of the TCP header to output it to a table 103. The table 103 outputs a timer set value corresponding to the detected source port address to a register 104 where the timer set value is retained. The table 103 will be described later (FIG. 9).

The transmitted data packet transferred from the routing processor 101 to the DCE 109 and the received data packet transferred in the reverse direction are both input to a packet termination detector 105 and a packet start detector 106.

The packet termination detector 105 detects when the transfer of transmitted and received packets has come to an end. When the packet termination is detected, the detector 105 outputs a start signal to a timer 108. This start signal causes the timer 108 to start counting.

The packet start detector 106 detects when the transfer of transmitted or received packets begins. When the beginning is detected, the detector 106 outputs a pulse signal to the timer 108 and the DCE 109. This pulse signal as a timer stop signal causes the timer 108 to stop counting and to return to its initial state. At the same time, the pulse signal as a connection signal causes the DCE 109 to make a public circuit connection and to send a transmitted packet to the public circuit.

An exclusive OR circuit 107 compares the count value of the timer 108 with the timer set value stored in the register 104. When the count value reaches the timer set value, the exclusive OR circuit 107 outputs a pulse signal to the timer 108 and the DCE 109. This pulse signal as a stop signal causes the timer 108 to stop counting. The DCE 109 inputs this pulse signal as a disconnection signal and disconnects the public circuit.

Figure 2:
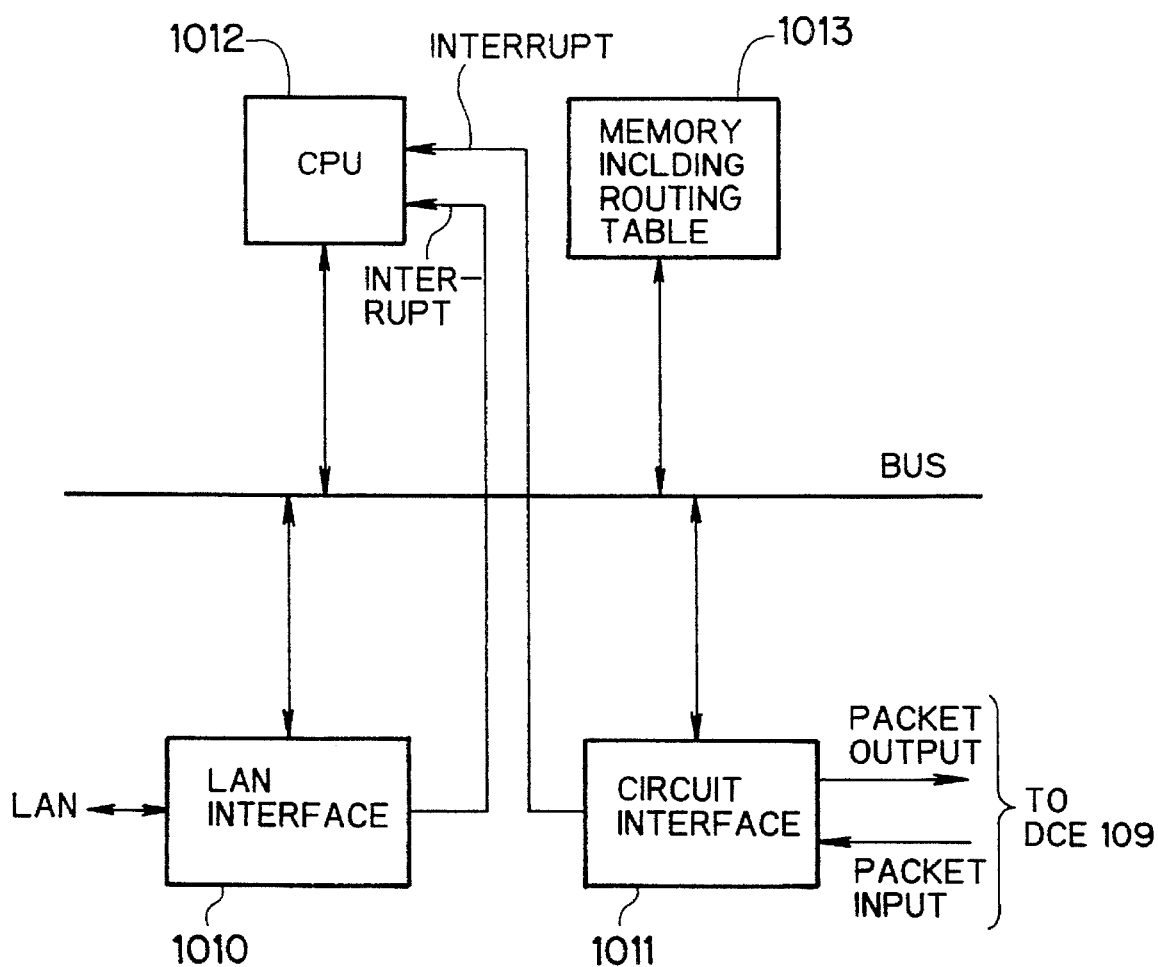
FIG. 2 is a detailed block diagram illustrating a routing processor shown in FIG. 1.

FIG. 2 shows a detailed configuration of the routing processor 101. ALAN is connected to a LAN interface 1010 and the DCE 109 is connected to a circuit interface 1011. When a packet is input to the interface 1010 or 1011, the interface generates an interruption to a central processing unit (CPU) 1012. The CPU 1012, referring to the routing table stored in memory 1013, performs a communication control to the LAN interface 1010 and the circuit interface 1011.

FIGS. 3A and 3B show the packet formats for the LAN interface 1010 and the circuit interface 1011, respectively. Both packets have a destination address in the IP header. Figure 3C shows a routing table where the output ports corresponding to destination addresses are predetermined. The operation of the routing processor 101 is explained below in further detail.

Figure 4:
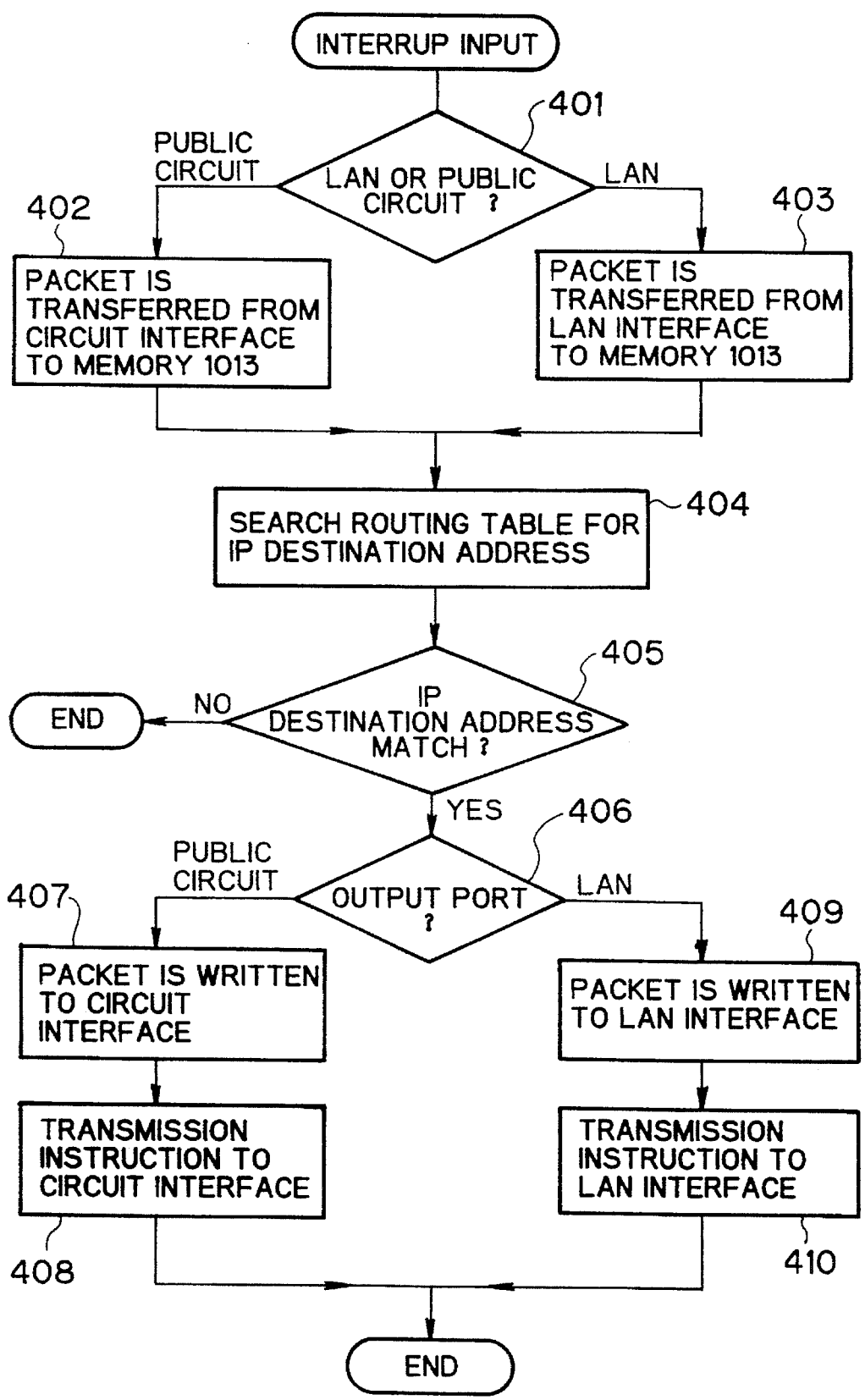
FIG. 4 is a flowchart showing a control operation of the routing processor of FIG. 2.

FIG. 4 shows a control operation of the routing processor 101. Referring to FIG. 4, when an interrupt request occurs, the CPU 1012 determines which generates this interrupt request, the LAN interface 1010 or the circuit interface 1011 (step 401). If the circuit interface 1011 does, the received data packet is transferred from the circuit interface 1011 to a memory 1013 (step 402). If the interrupt request is generated in the LAN interface 1010, the transmitted data packet is transferred from the LAN interface 1010 to the memory 1013 (step 403).

Then, the routing table in the memory 1013 is searched for a match with the destination address of the IP header (step 404). If a match is found with the destination address in the routing table (Yes at 405), it is determined which output port is used, the public circuit or LAN (step 406). For the public circuit output port, the data packet is transferred from the memory 1013 to the circuit interface 1011 (step 407) and a transmission instruction is output to the circuit interface 1011 (step 408). For the LAN output port, the packet is transferred from the memory 1013 to the LAN interface 1010 (step 409) and a transmission instruction is output to the LAN interface 1010 (step 410).

Figure 5:
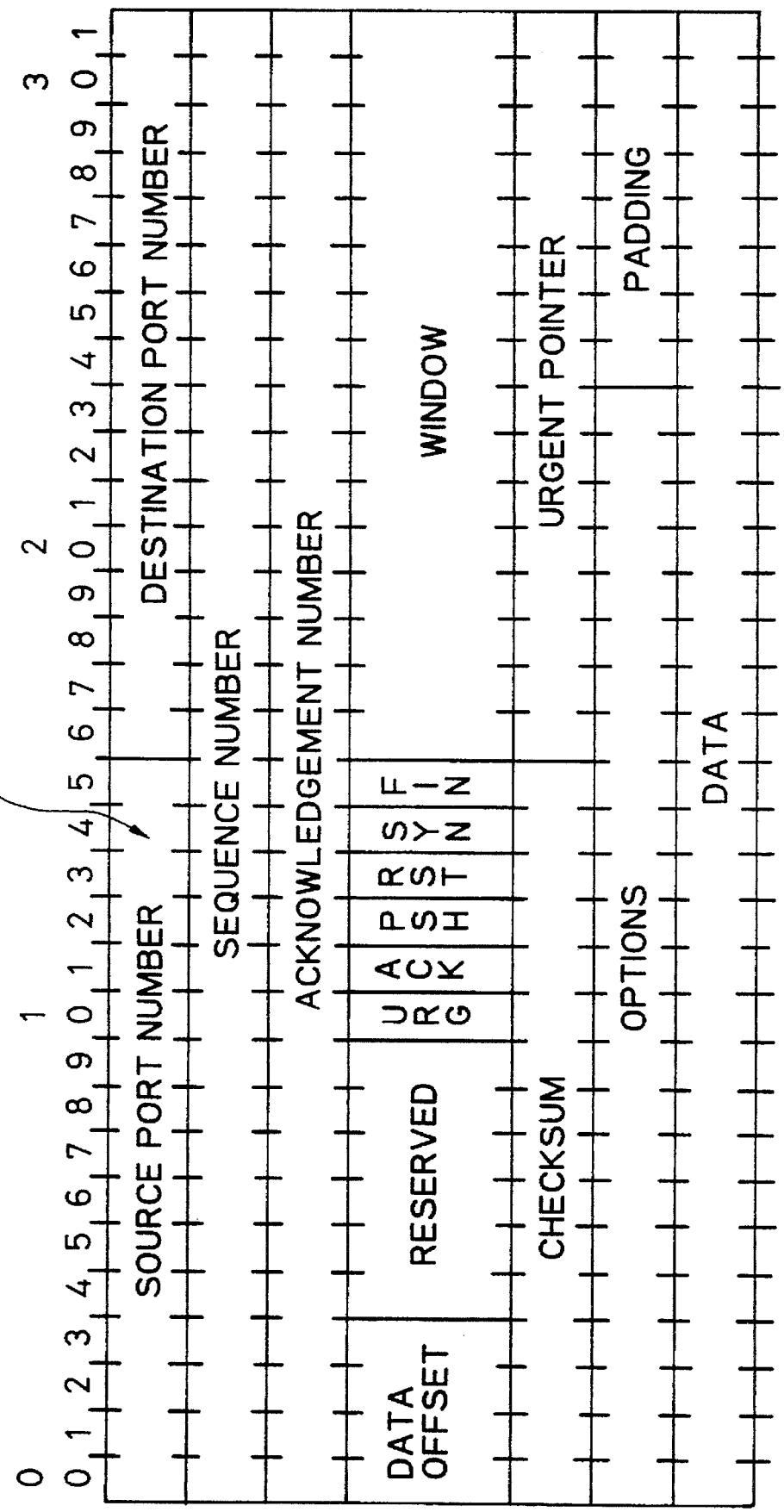
FIG. 5 is a schematic diagram showing the format of a TCP header.

When the source port number extractor 102 receives a transmitted data packet from the circuit interface 1011 of the routing processor 101, it reads out the source port number from the packet. As shown in FIG. 5, the first two octets of the TCP head in the packet are assigned to the source port number field 501.

Figure 6:
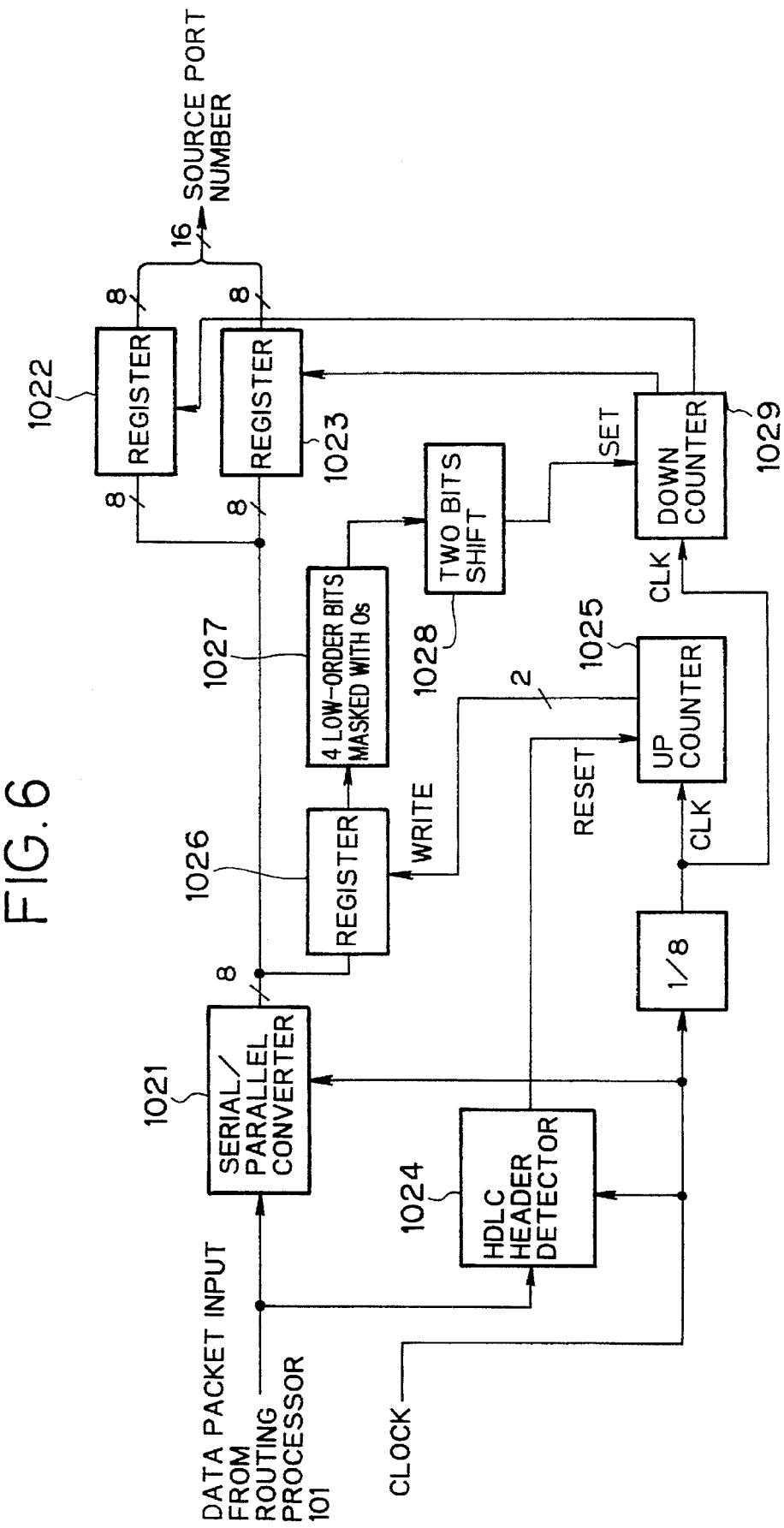
FIG. 6 Is a block diagram detailing the source port number extractor shown in FIG. 1.

FIG. 6 shows a detailed configuration of the source port number extractor 102. Data of a transmitted packet is converted to 8-bit parallel data by a serial-to-parallel converter 1021. The first two octets are stored in the respective two registers 1022 and 1023, and then the two octets stored in the registers 1022 and 1023 are output as a 16-bit source port number. When a transmitted data packet is input, it is detected by an HDLC header detector 1024 and an "up" counter 1025 is reset. The "up" counter 1025 is operated according to a clock given by the input clock frequency divided by eight(8). The output data of the serial-to-parallel converter 1021 is stored in a register 1026 based on the output of the "up" counter 1025. For data stored in the register 1026, the four low-order bits are masked with zeros (0s). Moreover, data is shifted to the right by two bits and is set in a "down" counter 1029. Parallel output data of the serial-to-parallel converter 1021 is stored in registers 1022 and 1023 based on the two outputs of the "down" counter 1027 and a 16-bit source port number is output from the registers 1022 and 1023.

Figure 7:
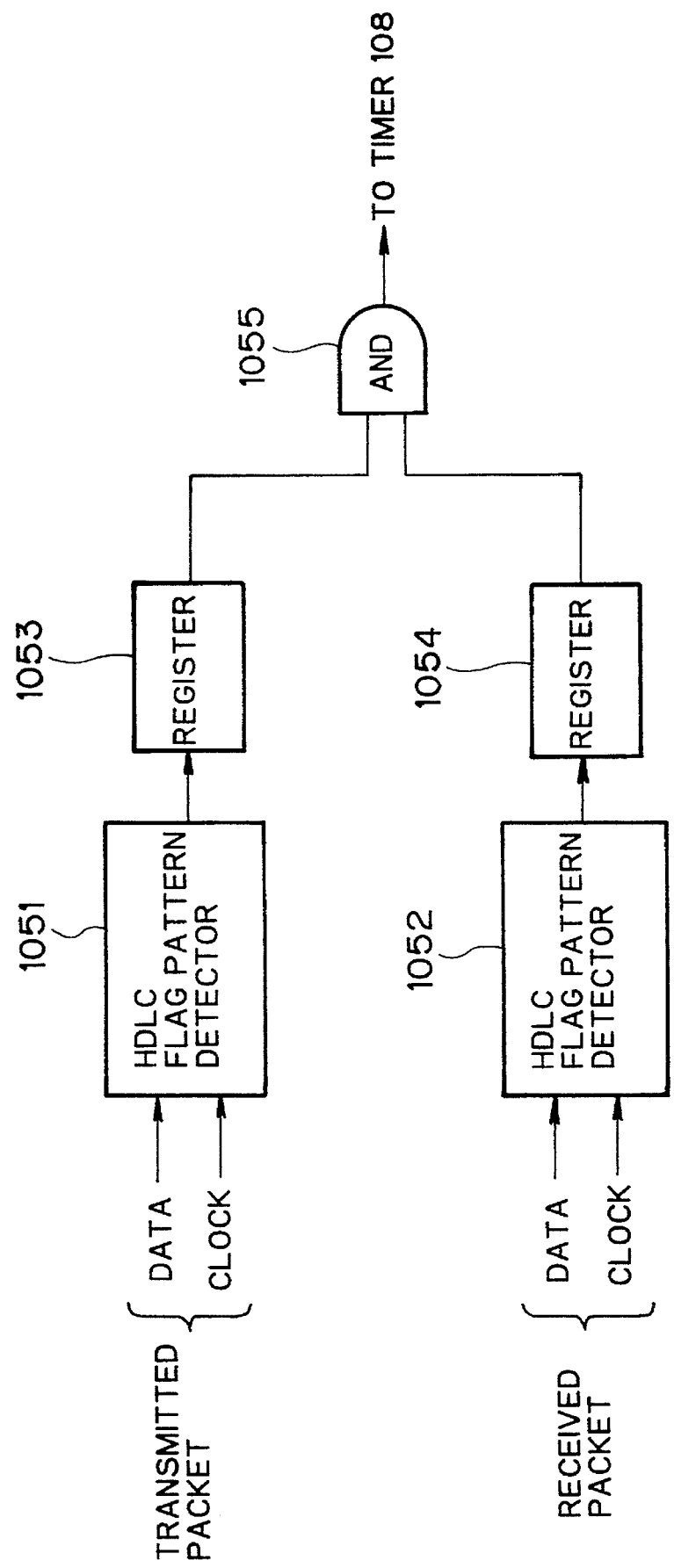
FIG. 7 is a block diagram detailing the packet termination detector shown in FIG. 1.

FIG. 7 shows a detailed configuration of the packet termination detector 105. Referring to FIG. 7, when the flag pattern "01111110" of a transmitted data packet is detected by a HDLC flag pattern detector 1051, the detection signal "1" is stored in a register 1053. Similarly, when the flag pattern of a received data packet is detected by a HDLC flag pattern detector 1052, the detection signal "1" is stored in a register 1054. If both registers 1053 and 1054 store "1", it means that neither a transmitted nor received packet has been input since detection of the HDLC frame termination flag. Therefore, when no packet inputs, an AND gate 1055 outputs "1" to the timer 108, and the timer 108 starts.

Figure 8:
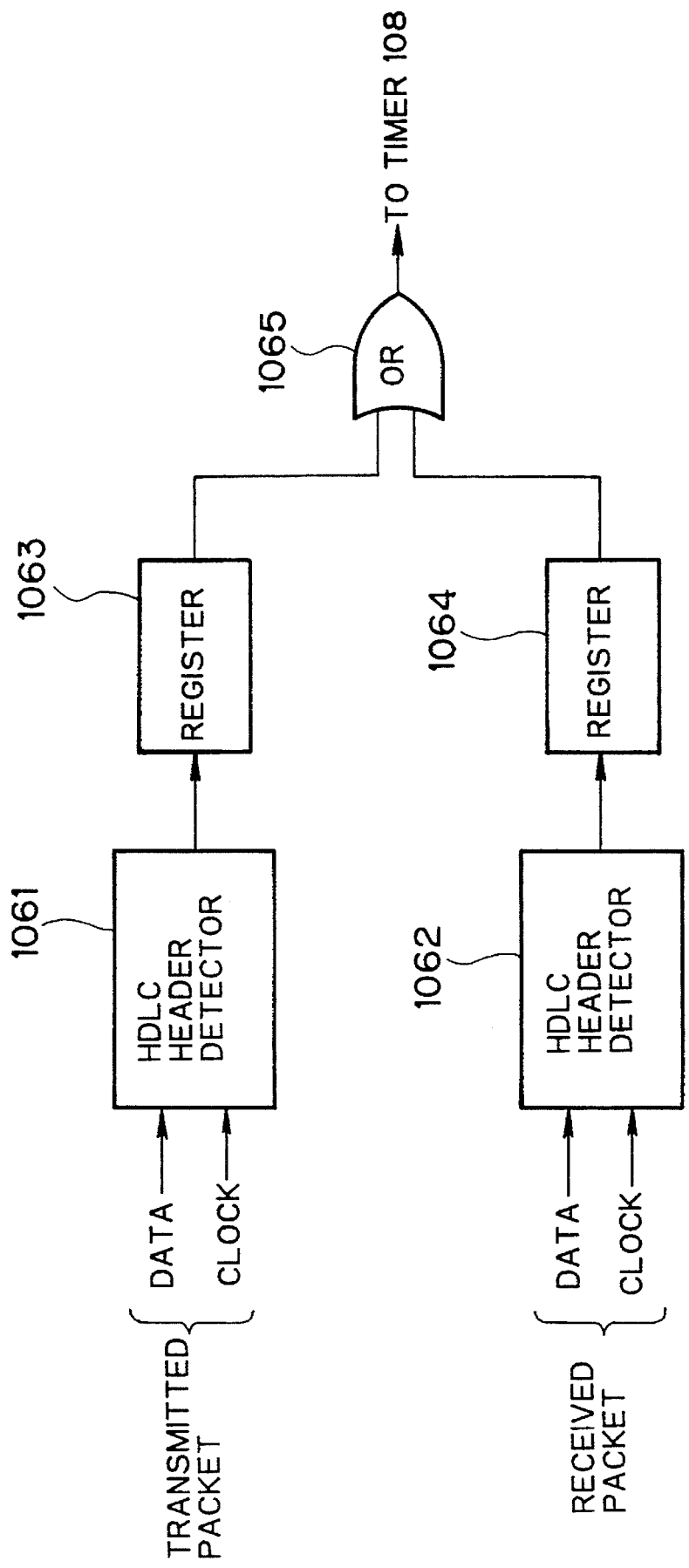
FIG. 8 is a block diagram detailing the packet start detector shown in FIG. 1.

FIG. 8 shows a detailed configuration of the packet start detector 106. Referring to FIG. 8, when the HDLC header of a transmitted packet is detected by a HDLC header detector

1061, the detection signal "1" is stored in a register 1063. Similarly, when the HDLC header of a received packet is detected by a HDLC header detector 1062, the detection signal "1" is stored in a register 1064. If either of registers 1063 and 1064 stores "1", it means that either a transmitted or received packet has been input. Therefore, when packet input starts, an OR gate 1065 outputs "1" to the timer 108, thereby stopping the timer 108 and causing the DCE 109 to connect the public circuit, as described above.

FIG. 9 shows an example of relationship between source port numbers and timer set values stored in the table 103. The table 103 comprises a port number field and a timer set value field. In this embodiment, when the higher level protocol is FTP, the port number is determined to be "10" and the timer set value in this case is set to 10 seconds. Moreover, for a remote terminal protocol (TELNET), the port number is determined to be "23" and the timer set value in this case is set to 600 seconds.

When a transmitted data packet is transferred from a consecutive processing application by the FTP, the public circuit is disconnected immediately after packet termination in order to prevent wasted public-circuit occupation and to save charges on public-circuit use. However, for a conversational application such as TELNET, a larger timer set value is set so that the public circuit will not be disconnected during operation because, even if packet termination is detected, another packet is very likely to be transmitted. Therefore, the table 103 uses the source port number of a transmitted packet to select a timer set value suitable for the application.

According to the table 103 as shown in FIG. 9, for an FTP application, the timer 108 continues counting for 10 seconds after packet termination has been detected by the packet termination detector 105. Since the count value reaches the timer set value when 10 seconds have passed, a disconnection signal is output from the EOR circuit 107 to the DCE 109 and the public circuit is disconnected.

On the other hand, for a TELNET application, the timer 108 continues counting for 600 seconds after packet termination has been detected. After 600 seconds elapse, the count value reaches the timer set value and a disconnection signal is output to the DCE 109.

As explained above, a packet transmission system according to the present invention can select a public-circuit connection time depending on the type of higher level packet application. In consecutive processing applications such as FTP, the established public circuit is disconnected immediately after packet termination, resulting in efficient use of a public circuit and saving of charges. In conversational applications such as TELNET, public-circuit disconnection during user's operation is prevented by setting a longer public-circuit holding time.

I claim:

1. A packet transmission system having a routing function to transmit packets between a first network and a second network, said packets being based on a TCP/IP (Transmission Control Protocol/Internet Protocol) specification, said packet transmission system comprising:

storage means for storing a plurality of time set values corresponding to a plurality of upper protocols, respectively, said upper protocols operating in layers higher than TCP (Transmission Control Protocol);

reading means for reading a time set value from said storage means corresponding to an upper protocol specified by a packet to be transmitted between said first network and said second network;

transmission termination detecting means for detecting termination of packet transmission between said first network and said second network;

timer means for measuring elapsed time from the detection of said termination of packet transmission; and control means for disconnecting said first network from said second network when said elapsed time measured by said timer means reaches said time set value which was read out from said storage means by said reading means.

2. The packet transmission system as set forth in claim 1, further comprising transmission start detecting means for detecting a beginning of packet transmission between said first network and said second network, said transmission start detecting means also for causing said timer means to stop and said control means to connect said first network with said second network when said beginning of packet transmission is detected.

3. The packet transmission system as set forth in claim 1, wherein said storage means stores a table comprising said time set values and a plurality of source port numbers corresponding to said upper protocols, respectively.

4. The packet transmission system as set forth in claim 3, wherein said reading means comprises:

means for extracting a source port number from a TCP header of said packet; and means for reading out said time set value from said table according to said source port number.

5. An apparatus having a routing processor and data-circuit terminating equipment for transmitting packets between a local area network (LAN) and a public network, said packets being based on a TCP/IP (Transmission Control Protocol/Internet Protocol) specification, said apparatus comprising:

storage means for storing a plurality of time set values corresponding to a plurality of upper protocols, respectively, said upper protocols operating in layers higher than TCP (Transmission Control Protocol);

reading means for reading a time set value from said storage means according to an upper protocol specified by a packet to be transmitted from said LAN to said public network;

transmission termination detecting means for detecting termination of packet transmission between said LAN and said public network;

a timer which starts operating when said termination of packet transmission is detected; and comparison means for comparing an output of said timer with said time set value, said comparison means outputting a public-circuit disconnection signal to said data-circuit terminating equipment when said output of said timer reaches said time set value.

6. The system as set forth in claim 5, further comprising transmission start detecting means for detecting a beginning of packet transmission between said LAN and said public network and for causing said timer to stop and said data-circuit terminating equipment to connect said LAN with said public network.

7. The system as set forth in claim 5, wherein said storage means stores a table comprising said time set values and a plurality of source port numbers corresponding to said upper protocols, respectively.

8. The system as set forth in claim 7, wherein said reading means comprises:

means for extracting a source port number from a TCP header of said packet; and means for reading out said time set value from said table according to said source port number.

9. A method of terminating a connection for transmitting packets between a first network and a second network, said packets being based on a TCP/IP (Transmission Control Protocol/Internet Protocol) specification, said method comprising steps of:

a) storing a plurality of time set values corresponding to a plurality of upper protocols, respectively, said upper protocols operating in layers higher than TCP (Transmission Control Protocol);

b) selecting a time set value from said plurality of time set values according to an upper protocol specified by a packet to be transmitted between said first network and said second network;

c) detecting termination of packet transmission between said first network and said second network;

d) measuring a lapse of time after detection of said termination of packet transmission; and e) disconnecting said first network from said second network when said lapse of time reaches said time set value which was selected by said step (b).

10. The method as set forth in claim 9, further comprising steps of:

detecting a beginning of packet transmission between said first network and said second network;

stopping said step (d) of measuring said lapse of time when said beginning of packet transmission is detected; and connecting said first network with said second network when said beginning of packet transmission is detected.

11. The method as set forth in claim 9, wherein said step (a) of storing comprises a step of storing a table comprising said time set values and a plurality of source port numbers corresponding to said upper protocols, respectively.

12. The method as set forth in claim 11, wherein said step (b) of selecting comprises:

extracting a source port number from a TCP header of said packet; and reading out said time set value from said table according to said source port number.

* * * * *